US012358182B2

(12) United States Patent
Heuboeck et al.

(10) Patent No.: US 12,358,182 B2
(45) Date of Patent: Jul. 15, 2025

(54) FORMWORK DEVICE

(71) Applicant: Umdasch Group NewCon GmbH, Amstetten (AT)

(72) Inventors: Christian Heuboeck, Amstetten (AT); Richard Markus Leutgeb, Amstetten (AT)

(73) Assignee: UMDASCH GROUP NEWCON GMBH, Amstetten (AT)

( * ) Notice: Subject to any disclaimer, the term of this patent is extended or adjusted under 35 U.S.C. 154(b) by 249 days.

(21) Appl. No.: 17/755,312

(22) PCT Filed: Oct. 30, 2020

(86) PCT No.: PCT/EP2020/080487
§ 371 (c)(1),
(2) Date: Apr. 26, 2022

(87) PCT Pub. No.: WO2021/084057
PCT Pub. Date: May 6, 2021

(65) Prior Publication Data

US 2022/0396007 A1 Dec. 15, 2022

(30) Foreign Application Priority Data

Oct. 31, 2019 (EP) .................................... 19206423

(51) Int. Cl.
*B28B 7/00* (2006.01)
*B28B 7/08* (2006.01)
(Continued)

(52) U.S. Cl.
CPC .............. *B28B 7/245* (2013.01); *B28B 7/002* (2013.01); *B28B 7/082* (2013.01)

(58) Field of Classification Search
CPC ....... B28B 7/085; B28B 7/082; E04G 21/168; E04G 19/003
See application file for complete search history.

(56) References Cited

U.S. PATENT DOCUMENTS 1,462,186 A * 7/1923 Zenke .................... B22D 7/005 249/119
3,080,636 A * 3/1963 Zerlaut ................. B28B 7/0044 425/453
(Continued)

FOREIGN PATENT DOCUMENTS

DE 218127 C 1/1910
DE 3311243 A1 * 10/1984 ............. E04G 11/36
(Continued)

OTHER PUBLICATIONS

DE-102017204413 (Von Limburg) Aug. 2018 (online machine translation), [Retrieved on Jan. 26, 2024]. Retrieved from: Espacenet (Year: 2018).*
(Continued)

*Primary Examiner* — Alison L Hindenlang
*Assistant Examiner* — Andres E. Behrens, Jr.
(74) *Attorney, Agent, or Firm* — McCoy Russell LLP

(57) ABSTRACT

The disclosure relates to a formwork device, in particular for arrangement between two bulkhead partitions of a battery mould, for manufacturing construction elements, in particular precast concrete elements, said formwork device comprising two formwork elements which each have a formwork front side for applying concrete and a formwork rear side, wherein the formwork elements are pivotably connected to one another at first end regions so that the formwork elements can be transferred from a vertical state into a horizontal state. The formwork device also comprises a spreading device for spreading apart second end regions of the formwork elements starting from the vertical state of the formwork elements, said second end regions being opposite the articulated connection. The disclosure also relates to: a battery mould comprising two bulkhead partitions and a formwork device according to the disclosure; a method for manufacturing a precast concrete element with the aid of the
(Continued)

formwork device according to the disclosure; and a method for preparing the manufacture of a precast concrete element with the aid of the formwork device according to the disclosure.

13 Claims, 8 Drawing Sheets

(51) Int. Cl.

| | |
|---|---|
| ***B28B 7/24*** | (2006.01) |
| ***E04G 11/00*** | (2006.01) |
| ***E04G 11/10*** | (2006.01) |
| ***E04G 19/00*** | (2006.01) |
| ***E04G 21/00*** | (2006.01) |
| ***E04G 21/16*** | (2006.01) |

(56) References Cited

U.S. PATENT DOCUMENTS

| | | | | |
|---|---|---|---|---|
| 3,827,840 A * | 8/1974 | Kistler | E04G 19/003 52/109 |
| 5,261,645 A * | 11/1993 | Huffman | F21V 21/36 248/329 |
| 5,338,498 A * | 8/1994 | Lefebvre | E04G 11/02 249/161 |
| 5,616,349 A * | 4/1997 | Sasaki | E04G 11/38 425/186 |
| 5,766,653 A | 6/1998 | Wiggs et al. | |
| 2003/0234339 A1* | 12/2003 | Heide | B28B 15/002 425/432 |
| 2018/0179769 A1* | 6/2018 | Schreyer | B28B 7/08 |

FOREIGN PATENT DOCUMENTS

| | | | |
|---|---|---|---|
| DE | 102017204413 A1 * | 9/2018 | B28B 7/08 |
| EP | 672806 B1 * | 5/1998 | E04G 19/003 |
| EP | 2839096 B1 * | 3/2018 | E04G 19/003 |
| EP | 3565692 B1 * | 7/2020 | B28B 7/0014 |
| FR | 2546951 A1 * | 12/1984 | E04G 11/10 |
| FR | 2853924 A1 * | 10/2004 | B66C 13/04 |
| WO | 2016184947 A1 | 11/2016 | |
| WO | 2017174432 A1 | 10/2017 | |

OTHER PUBLICATIONS

DE102017204413 (Felix) Sep. 2018 (online machine translation), [Retrieved on Jun. 21, 2024]. Retrieved from: Espacenet (Year: 2018).* https://www.beacontechnology.com/lifting-tables/air-and-mechanical-scissor-lift/spring-scissor-lift-mostly-stainless-steel/, Jul. 23, 2018 (Year: 2018).*

DE 3311243 A1 (Klaus) Oct. 1984 (online machine translation), [Retrieved on May 21, 2025]. Retrieved from: Espacenet (Year: 1984).*

FR-2853924-A1 (Ahr ) Oct. 2004 (online machine translation), [Retrieved on May 21, 2025]. Retrieved from: Espacenet (Year: 2004).*

FR 2546951 A1 (Boulemberg) Dec. 1984 (online machine translation), [Retrieved on May 21, 2025]. Retrieved from: Espacenet (Year: 1984).*

EP-2839096-B1 (Wolfgang ) Mar. 2018 (online machine translation), [Retrieved on May 21, 2025]. Retrieved from: Espacenet (Year: 2018).*

EP 3565692 B1 (Von Limburg) Jul. 2020 (online machine translation), [Retrieved on May 21, 2025]. Retrieved from: Espacenet (Year: 2020).*

EP 672806 B1 (Bard) May 1998 (online machine translation), [Retrieved on May 21, 2025]. Retrieved from: Espacenet (Year: 1998).*

ISA European Patent Office, International Search Report Issued in Application No. PCT/EP2020/080487, Jan. 19, 2021, WIPO, 4 pages.

* cited by examiner

FORMWORK DEVICE

CROSS REFERENCE TO RELATED APPLICATIONS

The present application is a U.S. National Phase of International Application No. PCT/EP2020/080487 entitled "FORMWORK DEVICE," and filed on Oct. 30, 2020. International Application No. PCT/EP2020/080487 claims priority to European Patent Application No. 19206423.6 filed on Oct. 31, 2019. The entire contents of each of the above-listed applications are hereby incorporated by reference for all purposes.

TECHNICAL FIELD

The disclosure relates to a formwork device, in particular, for the arrangement between two bulkhead partitions of a battery mould, for the manufacture of construction elements, in particular, precast concrete elements, comprising:

two formwork elements, in particular, formwork panels, each of which comprises a formwork front side for concrete to be applied, and a formwork rear side, wherein the formwork elements are pivotably connected to each other at the first end regions so that the formwork elements can be transferred from a standing state to a lying state.

Furthermore, the disclosure relates to a battery mould comprising two bulkhead partitions and a formwork device that can be arranged between the bulkhead partitions.

Finally, the disclosure relates to a process for manufacturing a precast concrete element, as well as a method for preparing the manufacture of a precast concrete element.

BACKGROUND AND SUMMARY

Battery moulds are often used in the series production of precast concrete elements. Precast concrete elements are often particularly used in the production of prefabricated buildings. These precast concrete elements can be manufactured quickly and inexpensively in battery moulds. The WO 2016/184947 A1 shows a battery mould with a supporting device in which formwork devices are hung from above. These formwork devices each comprise two formwork panels, which are articulately connected to each other on one longitudinal side in order to be transferred from unfolded state to a folded state. Each formwork panel comprises a formwork front for attaching formwork units and a formwork rear side, wherein, in the folded state of the formwork device, the formwork rear sides of the formwork panels face each other. The formwork devices are loaded on a substrate in the unfolded state, wherein formwork elements are attached to the upward-facing formwork front sides of the horizontally aligned formwork panels. The formwork devices are then lifted using a lifting device, wherein the formwork rear sides of the formwork panels fold up. The formwork panels are positioned between two bulkhead partitions in such a way that cavities form between the formwork front sides, the formwork units and the bulkhead partitions, which cavities are filled with concrete.

In the case of prior art, the precast concrete elements can be hardened within the battery mould on the one hand. The disadvantage of this is that the entire battery mould is in use until the concrete hardens and cannot be used for casting further precast concrete elements.

In order to make the battery mould ready for use more quickly, it would be desirable to let the precast concrete elements dry on the formwork device outside the battery mould. However, the difficulty lies in finding a stable drying position, which also makes it easier to lift the precast concrete elements away from the formwork device. Furthermore, it would be desirable to facilitate the transfer of the formwork elements into the unfolded (lying) state.

The object of the present disclosure is to alleviate or remedy at least individual disadvantages of the prior art. In particular, the object of the present disclosure is to enable a faster reuse of the battery mould and to simplify the removal of the precast concrete elements. Another objective can be to facilitate the transfer of the formwork elements into the lying state for assembly with boundary elements for doors, windows, etc.

This object is achieved by a formwork device, a battery mould, a method for manufacturing a precast concrete element, and a method for preparing the manufacture of a precast concrete element.

Accordingly, the formwork device comprises a spreading device for spreading apart second end regions of the formwork elements starting from the standing state of the formwork elements, said second end regions being opposite the first end regions.

This formwork device can be used, in particular, for a battery mould with two bulkhead partitions.

The two preferably rectangular formwork elements are each pivotably connected at a first end region, in particular, on one of their longitudinal sides. For this purpose, an articulated connection between the first end regions of the formwork elements can be provided. As a result, the two formwork elements can be transferred from a standing state, in which the formwork elements are preferably aligned essentially vertically, into a lying state, in which the formwork elements are preferably aligned essentially horizontally. In the standing state, the first end regions form the upper ends of the formwork elements, and the second end regions form the lower ends of the formwork elements.

The formwork elements can be arranged in the standing state between the two bulkhead partitions of the battery mould for the manufacture of a construction element, in particular, a precast concrete element. In this case the formwork elements are in the folded (i.e., essentially standing, parallel to each other) state, wherein the formwork front sides point outwardly, and the formwork rear sides face each other. The two formwork front sides delimit cavities, into which concrete can be poured. The lying state of the formwork elements, on the other hand, can be used to attach formwork elements, in particular, boundary elements for door cut-outs and/or window cut-outs in the construction element, to the formwork front sides of the formwork elements.

The spreading device according to the disclosure at the second end regions of the formwork elements can favourably fulfil different functions depending on the embodiment at hand.

After casting the precast concrete elements in the cavities, the formwork device together with at least one construction element on a formwork front side, in particular, two construction elements on the two formwork front sides, can be removed from the interior space of the battery mould, in particular, thereby being lifted out using a lifting device. The precast concrete elements are in a hardened, but not yet completely dried state, which allows the construction element to be held on the respective front side of the formwork without counter pressure from the bulkhead partitions (or other formwork devices). For further drying of the construction element, the formwork device can be arranged in a drying position with spread-apart second end regions of the formwork elements outside the intermediate space of the battery mould. For this purpose, the spreading device engages at least during the placement of the formwork device with the construction element to be dried on the substrate at the second end regions—opposite the pivotable connection between the formwork elements. With the aid of the spreading device, the second end regions of the formwork elements are spread apart in such a way that the two formwork elements in the drying position form an inverted V-shape seen from a lateral view. The drying position is a stable intermediate position between the standing and the lying state of the formwork elements. Thereby, the formwork device can be arranged in the stable and space-saving drying position outside the interior space of the battery mould to dry the construction elements. Meanwhile, the interior space of the battery mould can already be used for the production of further construction elements. In the drying position, the spreading device causes the second end regions of the formwork elements to be secured against folding into the standing state and/or folding apart into the lying state. Thus, the spreading device initially drives the second end regions of the formwork elements apart and then keeps the formwork elements in the drying position. Preferably, the drying position in relation to the pivot angle, is closer in particular, several times closer to the standing state than to the lying state of the formwork elements. In particular, this embodiment also has the advantage that the lifting of the construction element from the formwork device after drying is significantly facilitated because the construction element is exposed to only low levels of load and, moreover, an adverse wobbling of the construction element is avoided.

In a further embodiment, the spreading device can also be used to perform transfer of the formwork elements from the standing state towards the lying state. Favourably, a manual unfolding of the formwork elements can be avoided.

For the purposes of this disclosure, the location and direction indications, such as "above", "below", "horizontal", "vertical", refer to an intended operating position of the formwork device and the battery mould position on a horizontal substrate.

The method according to the disclosure for manufacturing a precast concrete element comprises at least the following steps:

- providing for battery mould,
- arranging the formwork elements in a concreting position in an interior space between the two bulkhead partitions,
- casting of the precast concrete element in the interior space,
- removal of the formwork elements with the precast concrete element from the interior space of the battery mould,
- connecting the spreading device to the second end regions of the formwork elements, and
- arranging the formwork elements with the precast concrete element and the spreading device at the second end regions of the formwork elements in a drying position on a substrate outside the interior space of the battery mould, wherein the second end regions of the formwork elements are spread apart by the spreading device.

In this method, therefore, the formwork elements are arranged, with the aid of the spreading device, in the drying position with second end regions spread apart. The spreading device connects the second end regions of the formwork elements to one another in such a way that the second end regions are transferred from the standing state into the drying position, but not further in the direction of the lying state in order to be able to be placed in a stable triangular arrangement on a flat substrate. Preferably, the spreading device is detachably attached to the second end regions of the formwork elements before the formwork elements are placed on the substrate with the spreading device. Thus, the contact of the spreading device at the second end regions of the formwork elements with the substrate can be used to convert the lowering motion of the formwork device into the spreading apart of the second end regions of the formwork elements. In the placed-down state of the formwork device (i.e., without support from a lifting device from above), the formwork elements are located in the drying position in which the formwork elements are arranged at a defined angle to each other.

The method for preparing the manufacture of a precast concrete element comprises at least the following steps:

- provision of a formwork device,
- arranging the formwork elements in the standing state above a substrate,
- arranging the spreading device on the substrate,
- lowering the formwork elements onto the spreading device on the substrate,
- spreading apart the second end regions of the formwork elements by means of the spreading device.

In this method, the spreading device is used to transfer the formwork elements from the standing state towards the lying state. Preferably, the formwork elements are arranged above the substrate, in particular, with the aid of a lifting device, for example, a crane. Meanwhile, the spreading device is located on the substrate. By lowering the formwork elements onto the spreading device, the spreading device is operated in such a way that the second end regions of the formwork elements are transferred from the standing state towards the lying state. Depending on the embodiment of the spreading device, it can at least partially cause the formwork elements to unfold. Furthermore, the spreading device can also be used when folding the formwork elements, i.e., when transferring from the lying to the standing state.

It is favourable if the spreading device comprises a force deflection device attacking the second end regions of the formwork elements, which force deflection device converts a lowering of the formwork elements into the spreading apart of the second end regions of the formwork elements. Due to the contact of the spreading device at the second end regions with the substrate or by lowering the formwork elements onto the spreading device previously placed on the substrate, the lowering motion, i.e., the vertical downward movement, of the formwork elements can cause the second end regions of the formwork elements to spread apart. As a result, the energy released by the vertical downward movement can be used to spread the second end regions of the formwork elements apart.

In accordance with a preferred embodiment, the force deflection device comprises two lever elements which are connected to each other via a pivot bearing, with a pivot axis which is preferably essentially stationary when spreading apart the formwork elements. With the aid of the two lever elements, the second end regions of the formwork elements can be spread apart particularly easily. The impact of the spreading device attached to the second end regions on the substrate or the lowering of the formwork elements on the spreading device located on the substrate is converted into a pivoting of the lever elements, which causes the second end regions of the formwork elements to spread apart. Preferably, the two lever elements are pivotably connected to each other by means of a pivot axis on the side of the substrate.

The spreading device, in particular, its lever elements, can be made of various materials. An embodiment made of metal, plastic, in particular, fibre-reinforced plastic, or a compound thereof is preferred.

In accordance with a particularly preferred embodiment, two spreading devices for engaging at the lateral edges at the second end regions of the formwork elements are provided. Favourably, the two spreading devices engage on two opposite sides of the lateral edges at the second end regions of the formwork elements. Thereby, a uniform spreading of the formwork elements over the entire length of the formwork device (i.e., the extension along the pivotable connection) can be ensured.

In accordance with a particularly preferred embodiment, the lever elements are essentially arranged horizontally in the spread-apart state of the second end regions of the formwork elements. Preferably, the two lever elements are arranged in a V-shaped position in a state of rest, i.e., before spreading the two end regions apart. When the formwork elements are spread apart, the lever elements are transferred from the state of rest, in which they engage the second end regions of the formwork elements in the standing state, to the horizontal position in which the second end regions of the formwork elements are spread apart and the two lever elements form an essentially 180° angle. In this case the two lever elements pivot in opposing directions around the pivot axis. In a lateral view, the two formwork elements have the shape of an isosceles triangle in the case of the second end sections spread apart together with the horizontally aligned lever elements, wherein the horizontally aligned lever elements form the base, and the formwork elements form the limbs thereof.

In order to connect the spreading device to the formwork elements, it is favourable if the formwork elements at the second end regions each comprise a connecting element for the preferably detachable connection with the spreading device.

In a preferred embodiment, two connecting tabs are provided as connecting elements, which connecting tabs are pivotably connected to the lever elements. As a result, a lever element and a connecting tab each form a toggle lever.

In accordance with a preferred embodiment, the lever elements and the connecting elements can be connected or are connected to each other via bolt connections, in particular, with bolts and bolt receptacles. As a result, the lever elements and the connecting elements can be easily connected to each other in a detachable way. Preferably, a bolt is inserted into a corresponding bolt receptacle.

In order to spread the formwork elements with the aid of gravity and the substrate, it is favourable if the pivot bearing comprises a preferably essentially horizontal contact surface for support on the substrate when lowering the formwork elements with the spreading device attached to it. Thus, the lever elements are pivoted apart by contact with the substrate and thus the second end regions of the formwork elements are spread apart.

In accordance with a further preferred embodiment, the lever elements comprise receiving recesses for accommodating corresponding guide elements, in particular, guide bolts, at the second end regions of the formwork elements. As a result, formwork elements can be precisely aligned against the spreading device. This embodiment is particularly suitable if the spreading device is initially separated, i.e., arranged at a distance from the formwork elements on the substrate and the formwork elements are then lowered onto the spreading device to remove the second end regions from each other by means of the spreading device.

In accordance with a preferred embodiment, a tensioning device, in particular, a spring, is provided for pre-tensioning the lever elements in the direction of a resting position of the lever elements before spreading apart the second end regions of the formwork elements. Thus, when the lever elements are pivoted, the spring is tensioned by spreading the second end regions apart. The lever elements are relaxed in the vertical position and can hold the formwork elements when in the standing state. When the second end regions of the formwork elements are spread apart, the lever elements are transferred to the horizontal position against a spring force of the spring so that the released energy of the lowering motion of the formwork elements is absorbed by the spring in order to tension it. Due to the intrinsic weight of the formwork elements, they sink in the direction of the substrate and, contrary to the spring force, move the lever elements rotatably mounted in a pivot point apart, whereby the second end regions of the formwork elements held by the spreading device are spread apart. The lifting of the formwork elements is supported by the spring force.

In accordance with a further preferred embodiment, a releasable locking device for locking the pivoting of the lever elements in their resting position is provided. This prevents the lever elements from moving before the formwork elements are arranged on the spreading device.

In order to align the formwork elements in the lying state, i.e., preferably essentially horizontally, it is favourable if an opening device for transferring the formwork elements from the spread-apart state of the second end regions into the lying state of the formwork elements is provided. As a result, after drying and removing the precast concrete elements from the formwork elements, the formwork elements can be transferred into the lying state in order to clean them and reload them with formwork units, such as boundary elements for windows and/or doors.

Furthermore, it is favourable if the opening device comprises at least one guide path for guiding support elements, in particular, support rollers, at the second end regions of the formwork elements. The formwork elements are moved from the spread-apart state of the second end regions by means of the opening device into the lying state of the formwork elements. The formwork elements can then be equipped with formwork units. This embodiment is particularly favourable in conjunction with the lever elements of the spreading device, because comparatively short lever elements can be used.

For better guidance of the formwork elements, it is favourable if the at least one guide path comprises at least one sloping transfer section for receiving the support elements, in particular, support rollers. As a result, the formwork elements can be guided from the standing into the lying state in a controlled manner In accordance with a particularly preferred embodiment, the locking device comprises a hook and a corresponding holding device for holding the hook, wherein the hook is arranged on one of the two lever elements, and the holding device is arranged on the other of the two lever elements. As a result, a locking of the lever elements can be easily achieved. By detaching the hook from the corresponding holding device, the lever elements can be moved against each other. Favourably, when arranging the two formwork elements on the spreading device, the hook is automatically released from the corresponding holding device so that, with the aid of the lever devices, the second end regions of the formwork elements can be spread apart.

BRIEF DESCRIPTION OF THE FIGURES

The disclosure is further explained below on the basis of non-limiting exemplary embodiments shown in the drawings.

DETAILED DESCRIPTION

Figure 1:
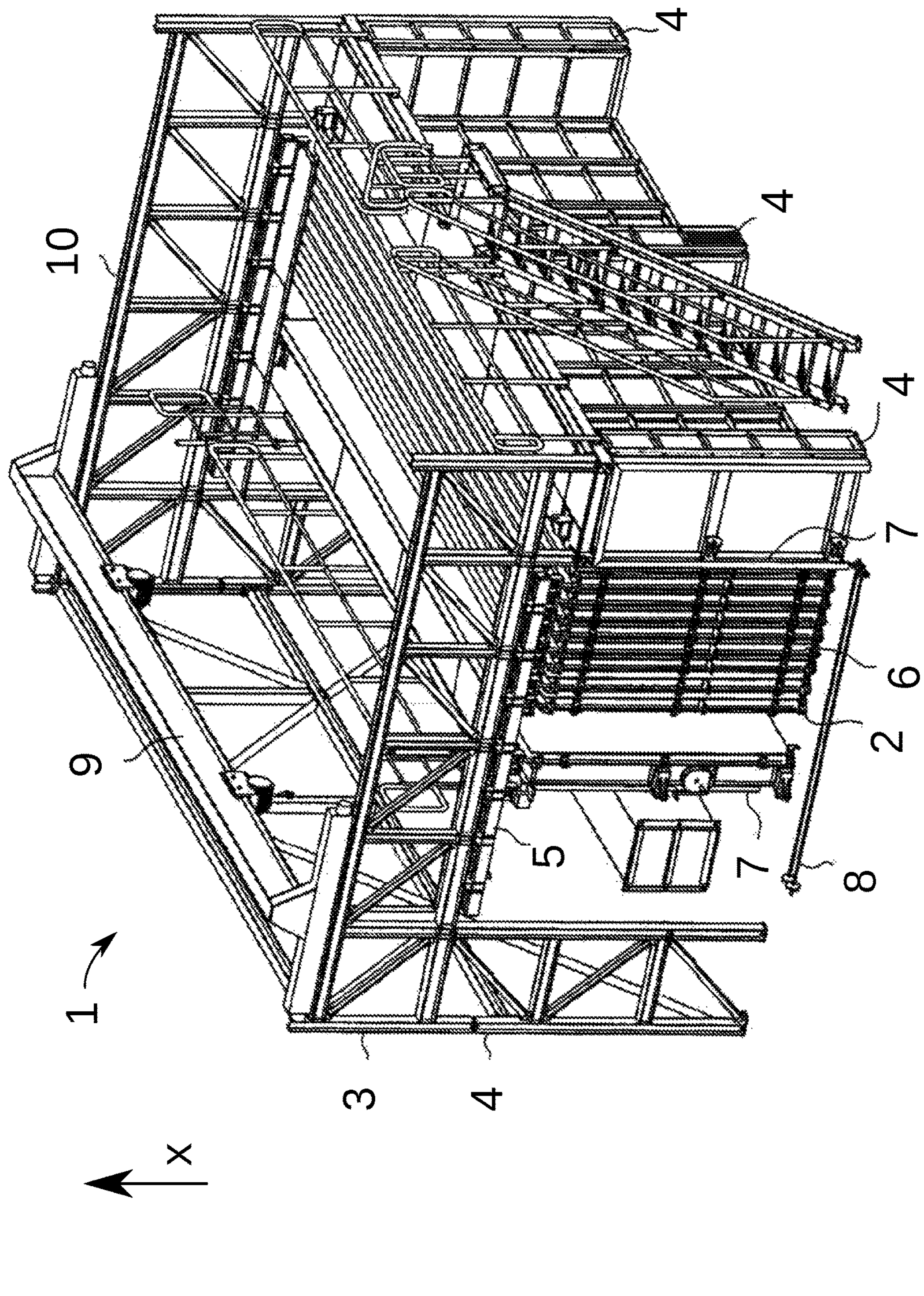
FIG. 1 shows schematically a battery mould with formwork devices.

FIG. 1 shows a schematic representation of a battery mould 1 with formwork devices 2 known, for example, from WO 2017/174432. The battery mould 1 is used for the production of construction elements not shown and in particular, precast concrete elements for buildings. The battery mould 1 comprises a carrying structure 3 with distanced support sections 4. The number of support sections 4 in FIG. 1 is only to be regarded as an example and can be adapted to the circumstances. Furthermore, the battery mould 1 comprises two support devices 5, in which the bulkhead partitions 6 and the formwork devices 2 are held in a suspended and moveable manner, i.e., in the present embodiment shiftable. The formwork devices 2 are located between the bulkhead partitions 6. Between at least one bulkhead 6 and a formwork device 2, a cavity to be filled with concrete is formed, wherein preferably the formwork device 2 supports formwork units not shown, which determine the contour of the precast concrete element. The formwork units can, for example, delimit door cut-outs or window cut-outs and also seal the cavity filled with concrete during concreting. The formwork units can, for example, be attached to the formwork device 2 using magnetic holders. In addition, a heating device (not shown) and/or a vibrator (not shown) can also be mounted on the formwork device 2. The formwork device 2 is inserted between two bulkhead partitions 6 and clamped with them during concreting.

The number of support devices 5 of the bulkhead partitions 6 and of the formwork devices 2 is to be regarded merely as an example and can be varied depending on the circumstances at hand. For example, formwork devices 2 can be provided for concreting the outer walls, interior walls, the floor and the roof of a house so that, with the battery mould 1, the construction elements for an entire building can be produced simultaneously The bulkhead partitions 6 and the formwork devices 2 are clamped between two support devices 7. The number of support devices 7 is also to be regarded as merely an example and can be varied according to the requirements. At least one support device 7 is held in the support devices 5 in a moveable manner, i.e., in the present embodiment, being shiftable. For stabilisation in the concreting position, the formwork devices 2 and the support devices 7 can be connected and clamped with each other by one or a plurality of rod-shaped connecting devices 8. The number of connecting devices 8 can be adapted to the conditions at hand. Instead of rod-shaped connecting devices 8, hydraulic connecting devices are also possible. However, the rod-shaped connecting devices 8 are particularly robust and easy to handle. Furthermore, the battery mould 1 comprises a lifting device 9, with which at least one of the formwork devices 2 can be transferred from the lowered concreting position into a raised transport position, in which the formwork device 2 can be conveyed via a formwork device 2 located in the concreting position in a direction essentially perpendicular to the lifting direction X. In the case of the battery mould 1, the formwork devices 2 are hung from above into the support devices 5 so that they are distanced from the floor in the suspended state in the concreting position between the support sections 4. The design of the lifting device 9 can be adapted to the requirements at hand. If necessary, a plurality of lifting devices 9 can also be used.

The lifting device 9 is moveable on two distanced guide devices 10, which are designed here as running rails, in a clamping direction of the formwork devices 2. Furthermore, the guide devices 10 are arranged above the support devices 5 and parallel thereto. In order to make the battery moulds 1 more compact, the formwork devices 2 are attached to the support devices 5 at their upper end.

Instead of the known formwork devices 2 of FIG. 1, the formwork devices 2 according to the disclosure can be received in the battery mould 1, which are explained below.

Figure 2:
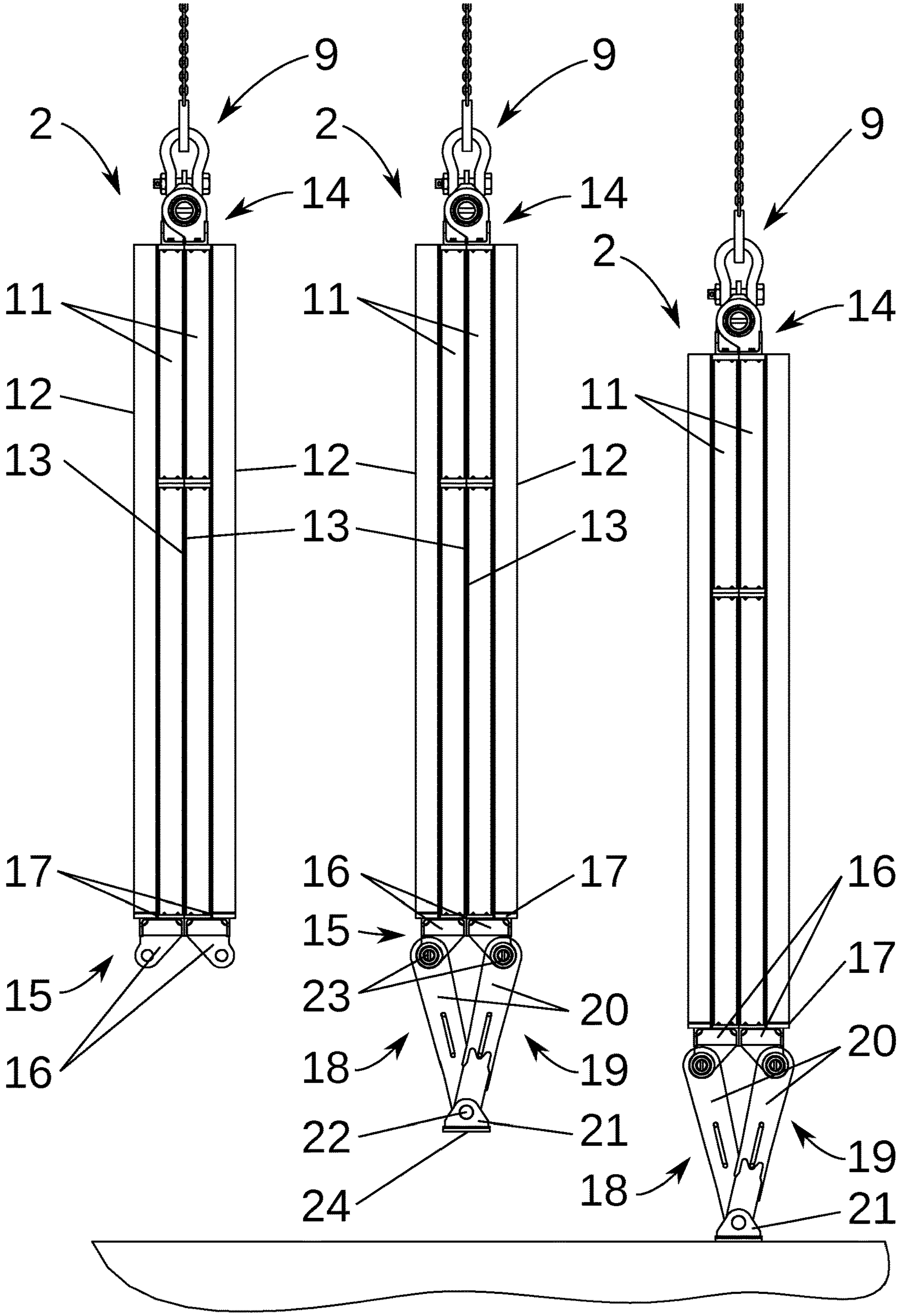
FIG. 2 shows schematically a formwork device according to the disclosure with two formwork elements in different positions when placing on a substrate for drying construction elements on the formwork elements, wherein the formwork device is shown on the left in the state lifted off from the substrate, in the middle with a spreading device at the lower end regions and, on the right, when contacting the substrate.

FIG. 2 shows a formwork device 2 for the arrangement between two bulkhead partitions 6 of a battery mould 1 in accordance with FIG. 1. The bulkhead partitions 6 can also be designed as further formwork elements. The formwork device 2 comprises two formwork elements 11, which are formwork panels in the embodiment shown. The formwork elements 11 each have a formwork front side 12 for concrete to be applied, and a formwork rear side 13, wherein the formwork elements 11 are pivotably connected to each other at first end regions 14 so that the formwork elements 11 can be transferred from a standing state into a lying state. The formwork elements 11 each comprise two connecting elements 16 at second end regions 15 located opposite to the first end regions 14, which connecting elements 16 are arranged at the two ends of the lower longitudinal edges 17 of the formwork elements 11.

FIG. 2 shows a formwork device 2 according to the disclosure, in which at least one spreading device 18 is used to spread apart the second end regions 15 of the formwork elements 11 (cf. FIG. 6) starting from the standing state of the formwork elements 11. Preferably, two spreading devices 18 are provided at a horizontal distance from each other. The spreading devices 18 are detachably connected to the connecting elements 16 of the formwork devices 11. In the embodiment shown, the spreading device 18 comprises a force deflection device 19 engaging at the second end regions 15 of the formwork elements 11, which force deflection device 19 converts a lowering of the formwork elements 11 into the spreading apart of the second end regions 15 of the formwork elements 11. The force deflection device 19 comprises two lever elements 20, which are connected to each other via a pivot bearing 21 with a pivot axis 22, which is essentially stationary when spreading apart the formwork elements 11. In the embodiment shown in accordance with FIGS. 2 to 4, connecting tabs are provided as connecting elements 16, to which the lever elements 20 are pivotably attached. In the embodiment shown, detachable bolt connections between the spreading device 18 and the connecting elements 16 on the formwork elements 11 are provided. In the embodiment shown, the bolt connections have bolts 23 and corresponding bolt receptacles. Thereby, a lever element 20 and a connecting tab each form a toggle lever. The pivot bearing 21 comprises an essentially horizontal contact surface 24 for support on the substrate when lowering the formwork elements 11 with the spreading device 18 attached to it.

In FIG. 2, the formwork elements 11 are arranged vertically in the standing state so that the formwork rear sides 13 point to each other and the formwork front sides 12 are facing bulkhead partitions 6 when arranging the formwork device 2 in a battery mould 1 between two bulkhead partitions 6.

Figure 3:
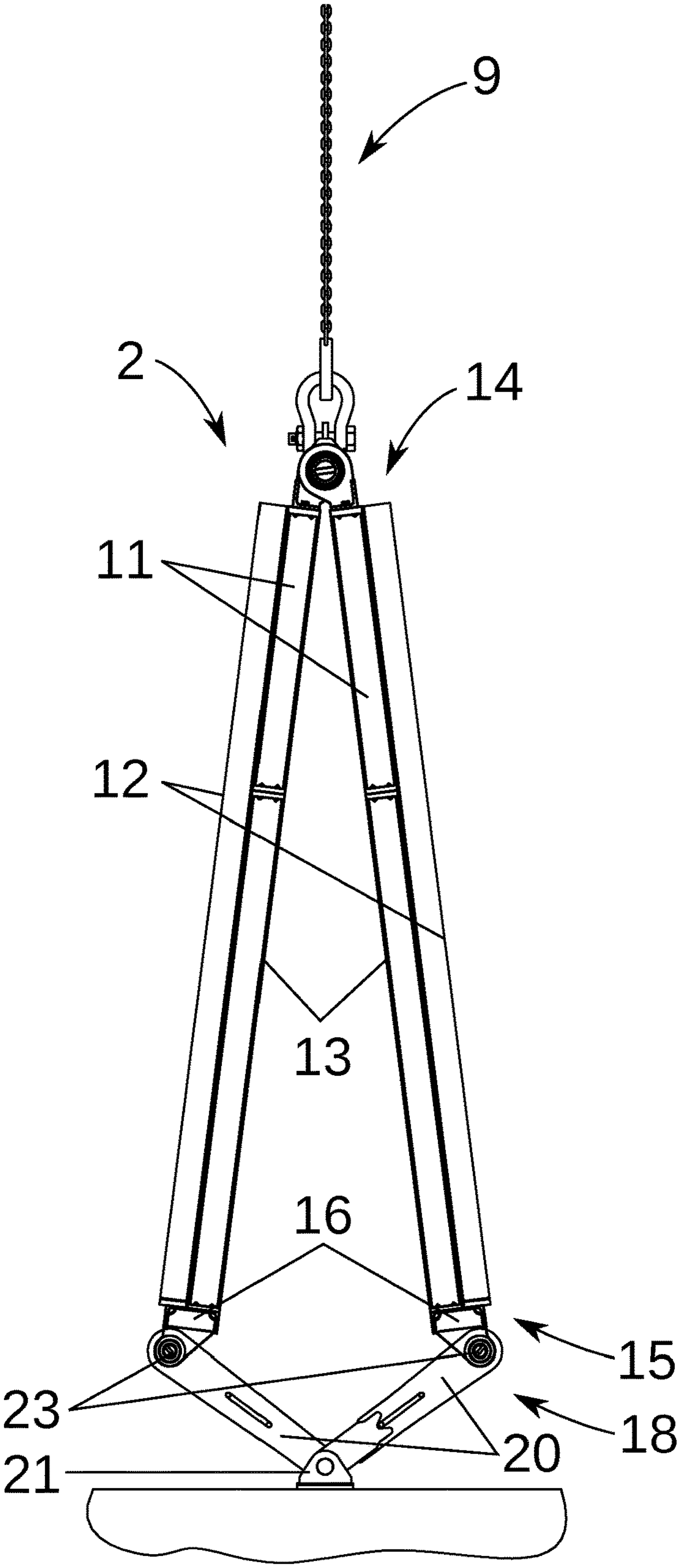
FIG. 3 schematically shows the formwork device in accordance with FIG. 1 during the transfer of the two formwork elements from the standing state to a spread-apart state.

In the right position of FIG. 2, the application of the spreading device 18 on the substrate is shown, whereby the spreading of the second end regions 15 of the formwork elements 11 is triggered. FIG. 3 shows the conversion of the lowering motion of the formwork device 2 with the spreading device 18 into the spreading apart of the second end regions 15 of the formwork elements 11.

Figure 4:
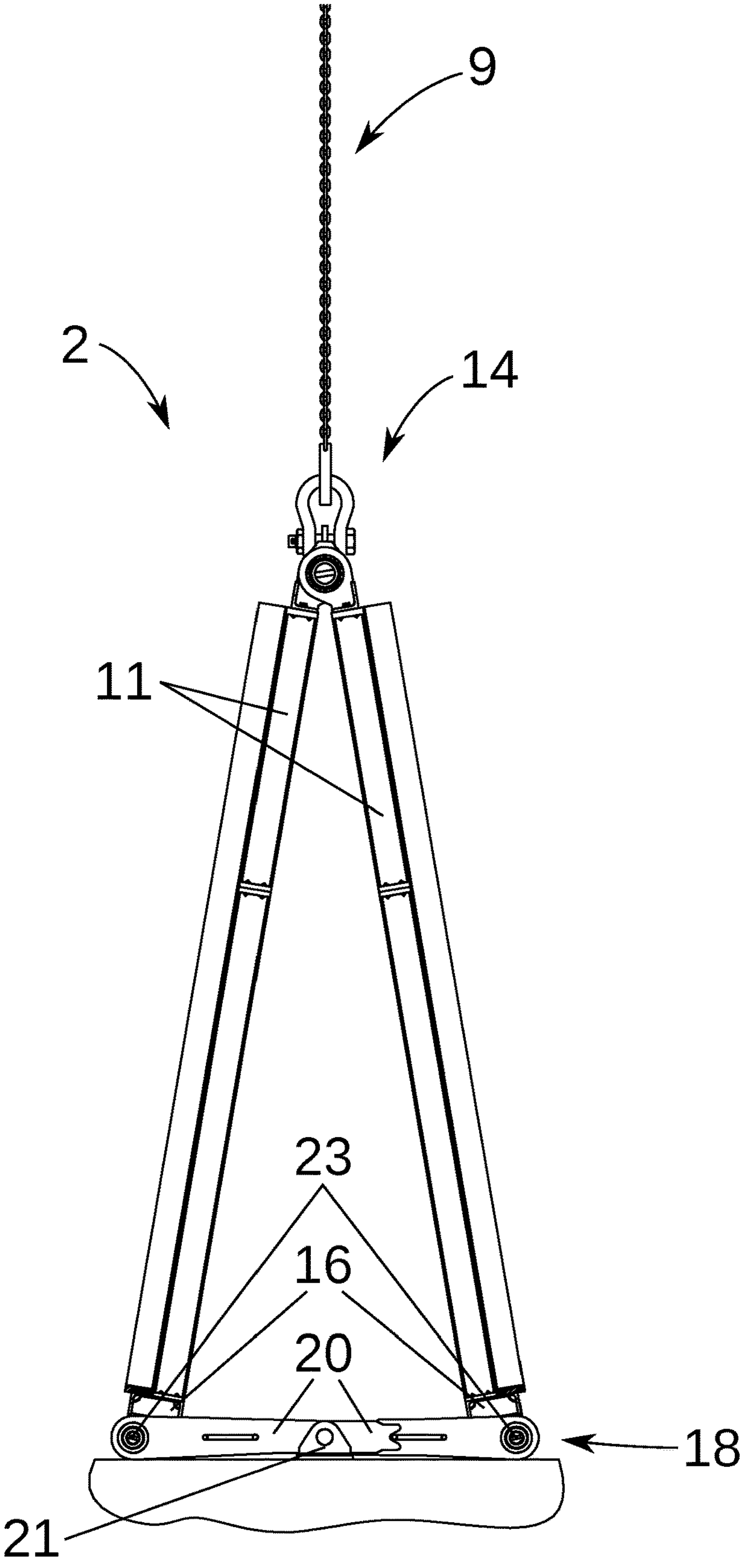
FIG. 4 schematically shows the formwork device in accordance with FIG. 3 in the spread-apart state.

As shown in FIG. 4, the lever elements 20 are essentially arranged horizontally in the spread-apart state of the second end regions 15 of the formwork elements 11.

For the preparation and drying of a precast concrete element, the following method can therefore be carried out. The formwork device 2 is arranged in the battery mould 1 in accordance with FIG. 1, wherein the formwork elements 11 of the formwork device 2 are arranged in a concreting position in an interior space between the two bulkhead partitions 6. Thereafter, with the aid of the formwork device 2, at least one precast concrete element is casted, wherein, preferably, a precast concrete part is respectively formed on both formwork elements 11. As a result, the simultaneous manufacture of two precast concrete elements is possible with the aid of formwork device 2. When arranging a plurality of formwork devices 2 between several bulkhead partitions 6 in the battery mould 1, a correspondingly large number of precast concrete elements can be cast. In a next step, the formwork device 2 including at least one precast concrete element is lifted out of the interior space of the battery mould using a lifting device, for example, the lifting device 9 in accordance with FIG. 1. The formwork elements 11 are in this case in a standing state in which the formwork elements 11, as shown in FIG. 2, are arranged in a vertically folded manner. Thereafter, two spreading devices 18 in accordance with FIGS. 2 to 4 are connected to the second end regions 15 of the formwork elements 11 at the two ends of the longitudinal sides 17 of the formwork elements 11, wherein bolts 23 are engaged with corresponding bolt receptacles. This bolt connection can be secured using splints. In one embodiment variant, the bolts 23 are provided on the connecting elements 16 and the bolt receptacles are provided on the lever elements 20. Of course, a reversed arrangement can also be provided. Furthermore, the bolts 23 can be detachably arranged in corresponding bolt receptacles of the connecting elements 16 and of the lever elements 20. In a next step, the formwork elements 11 with the precast concrete element and the spreading devices 18 are arranged at the second end regions 15 of the formwork elements 11 in a drying position on a substrate outside the interior space of the battery mould 1. In this case, in the standing state, the formwork elements 11 are moved downwards in the direction of a substrate with spreading tools 18 arranged on the connecting elements 16 using the lifting device 9 until, as shown in FIG. 2 on the right, the horizontal contact surface 24 rests on the substrate. In the case of further lowering of the formwork device 2, the second end regions 15 of the formwork elements 11 are spread apart by the spreading device 18 by moving the formwork elements 11 downwards via the weight force of the formwork elements 11, as shown in FIG. 3. Due to the stationary pivot axis 22 of the lever elements 20 of the spreading device 18 and the articulated connection between the lever elements 20 and the connecting elements 16 in the second end region 15 of the formwork elements 11, when lowering the formwork elements 11, these are spread apart in the second end regions 15. As a result, the lowering motion of the formwork elements 11 is converted when arranging on the substrate into the spreading apart of the second end regions 15 of the formwork elements 11. The formwork elements 11 are lowered and spread until the connecting elements 16 of the formwork elements 11 rest on the substrate. In this case the lever elements 20 are aligned horizontally so that the two lever elements 20 form a 180° angle. As a result, the formwork elements 11 are prevented from spreading further apart so that the formwork device 2 assumes a stable drying position, and the lifting device 9 can be removed without the formwork device 2 tipping over.

Figure 5:
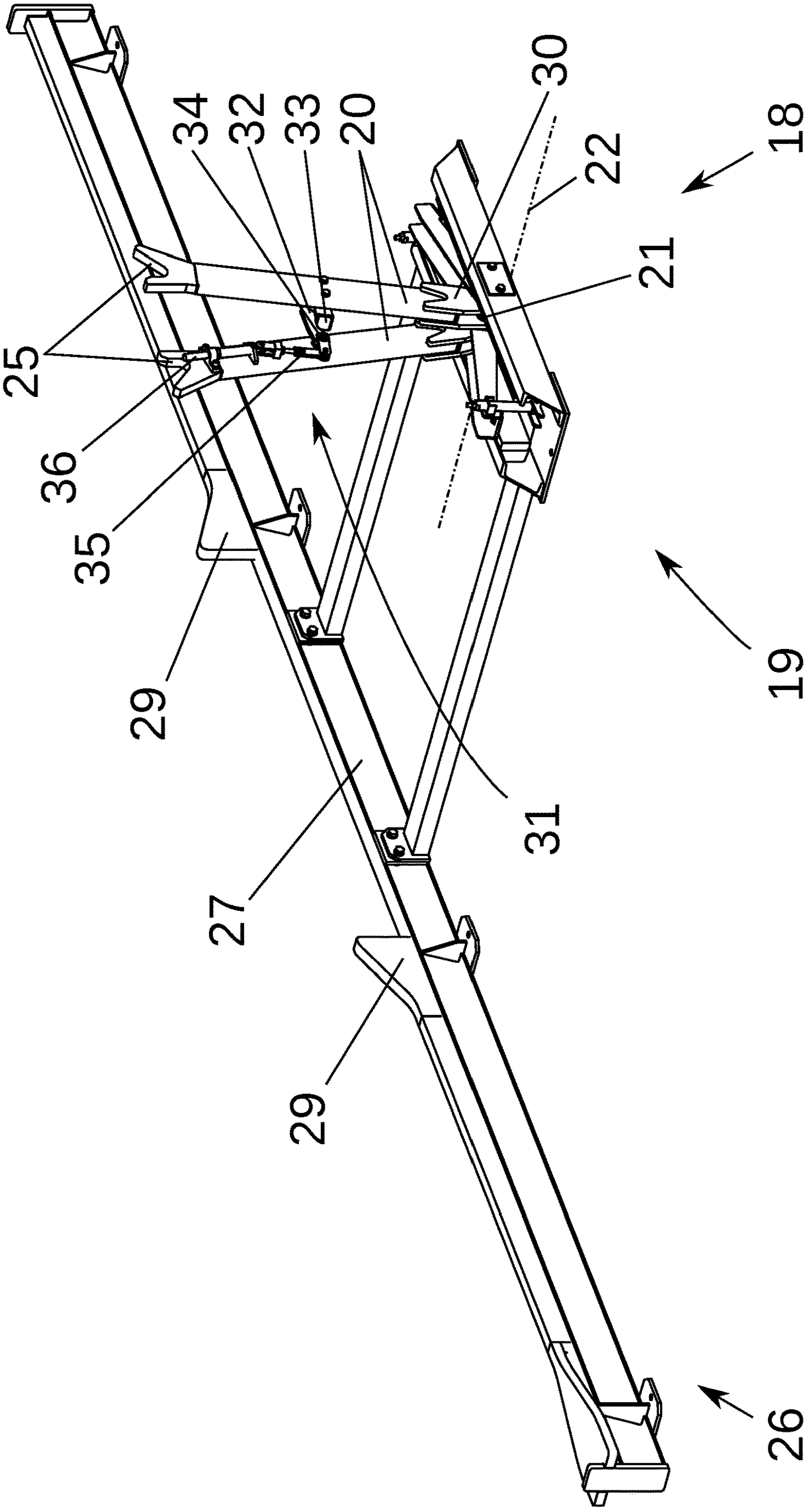
FIG. 5 shows schematically a further spreading device according to the disclosure.

FIG. 5 shows a further spreading device 18 according to the disclosure, which comprises a force deflection device 19 with two lever elements 20, which are connected to each other via a pivot bearing 21 with a pivot axis 22, which is essentially stationary when spreading apart the formwork elements 11. However, the lever elements 20 are formed here much longer than in the embodiment in FIGS. 2 to 4. In the embodiment shown in accordance with FIG. 5, the lever elements 20 comprise receiving recesses 25 for accommodating corresponding guide bolts at the second end regions 15 of the formwork elements 11 (cf. FIG. 7). Furthermore, the spreading device 18 comprises an opening device 26 for transferring the formwork elements 11 from the spread-apart state of the second end regions 15 into the lying state of the formwork elements 11. The opening device 26 comprises a guide path 27 for guiding support elements 28 at the second end regions 15 of the formwork elements 11, wherein the guide path 27 comprises two sloping transfer sections 29 for receiving the support elements 28.

In the embodiment shown, the spreading device 18 comprises a tensioning device 30, which comprises a spring. The tensioning device 30 is used for pre-tensioning the lever elements 20 in the direction of a resting position of the lever elements 20 before spreading apart the second end regions 15 of the formwork elements 11. This allows the erection of the formwork elements 11 to be supported when transferring from the lying position into the standing position. In the resting position, the two rod-shaped lever elements 20 form a V, wherein the receiving recesses 25 are arranged at the ends of the lever elements 20, which are arranged at the top of the V. In this case the two lever elements 20 form an angle between 15 and 25°, preferably 20°. Furthermore, the embodiment of the spreading device 18 shown in FIG. 7 comprises a releasable locking device 31 for blocking the pivoting of the lever elements 20 in their resting position. The locking device 31 comprises a hook 32 and a corresponding holding device 33 for holding the hook 32. In this case the hook 32 is arranged on one of the two lever elements 20 and the holding device 33 is arranged on the other of the two lever elements 20. The hook 32 is mounted rotatably via a pivot bearing 34 on the one lever element 20. When holding the hook 32 in the holding device 33, the lever elements 20 are blocked together so that they cannot be moved downwards in opposing directions. By detaching the hook 32 from the corresponding holding device 33, the lever elements 20 can be moved against each other. On one side of the pivot bearing 34 opposite hook 32, a coupling rod 35 is arranged, which is connected to a compression spring 36. The compression spring 36 extends into the receiving recess 25 of the lever element 20, on which the hook 32 is arranged in such a way that, when the guide bolts are received into the receiving recess 25, the compression spring 36 is actuated, whereby the coupling rod 35 connected to the compression spring 36 via the pivot bearing 34 releases the hook 32 from the holding device 33.

Figure 6:
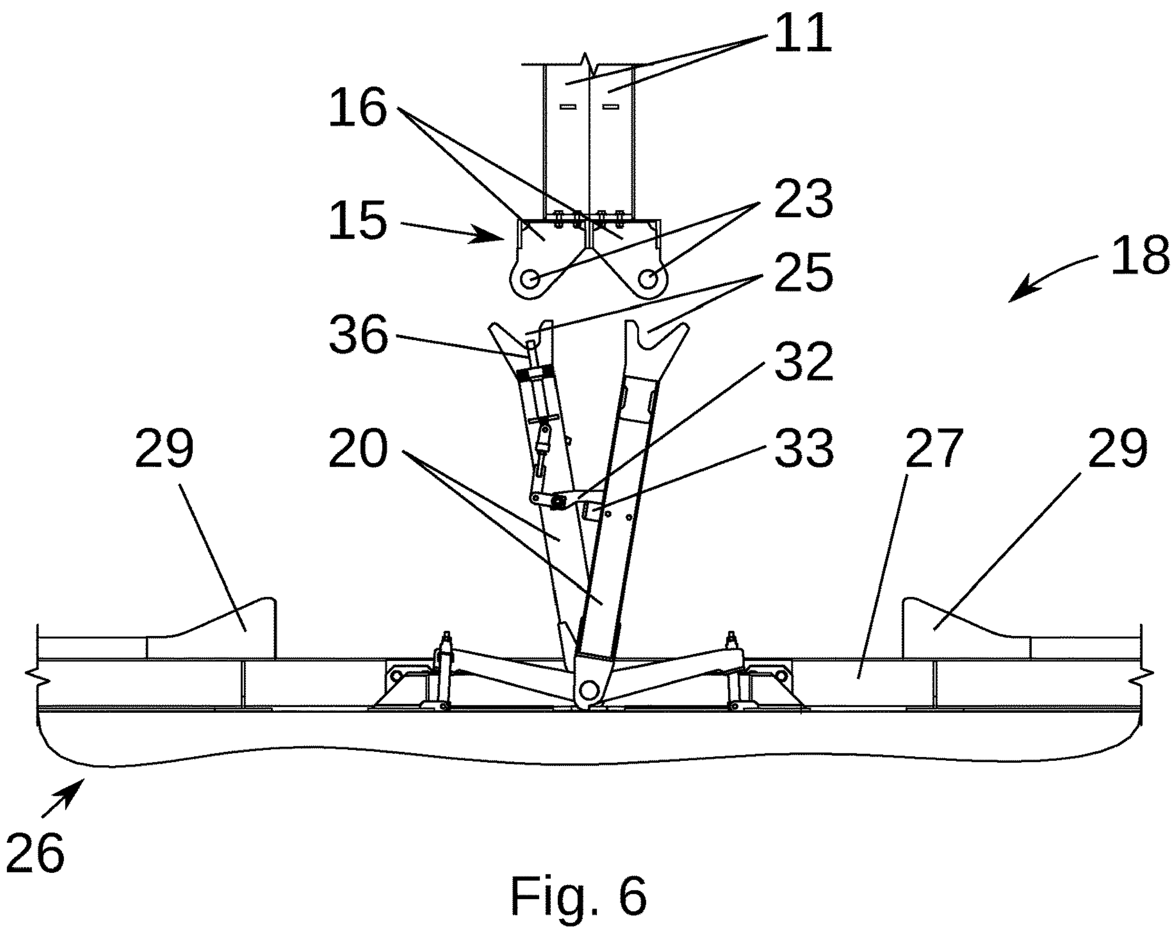
FIG. 6 schematically shows a detail of a formwork device with two formwork elements in a standing state and of the spreading device in accordance with FIG. 7.
Figure 7:
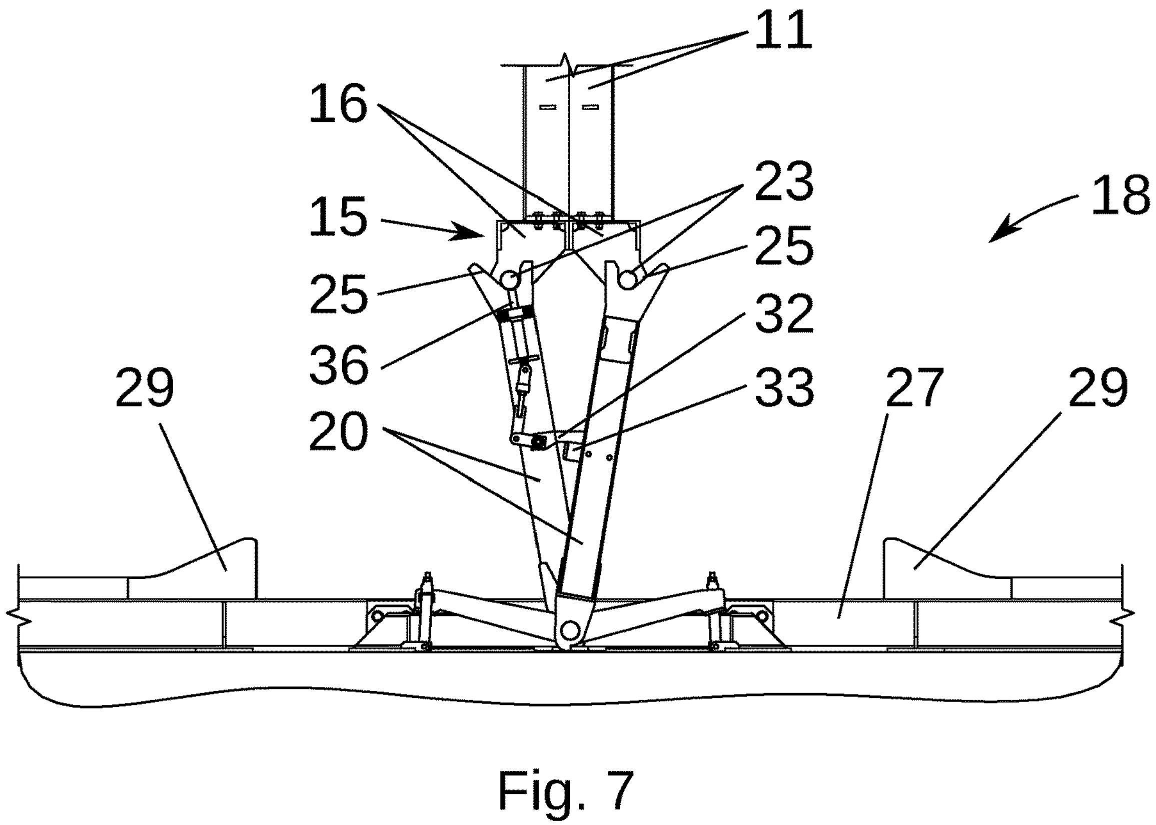
FIG. 7 schematically shows a detail of the formwork device in accordance with FIG. 6 when the formwork elements are received in the spreading device.
Figure 8:
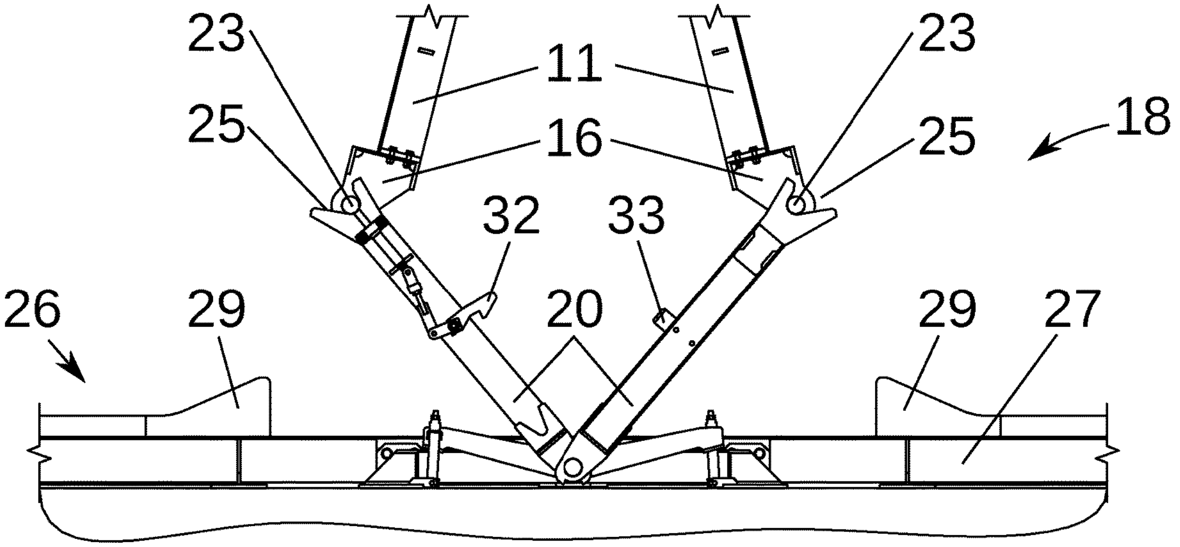
FIGS. 8 and 9 schematically show a detail of the formwork device in accordance with FIG. 8 during the transfer of the two formwork elements from the standing to a lying state.
Figure 9:
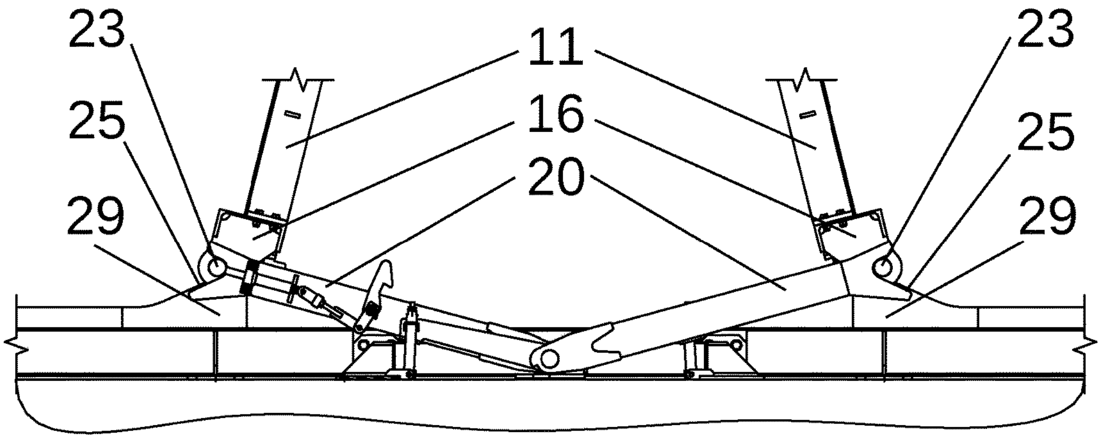
Figure 10:
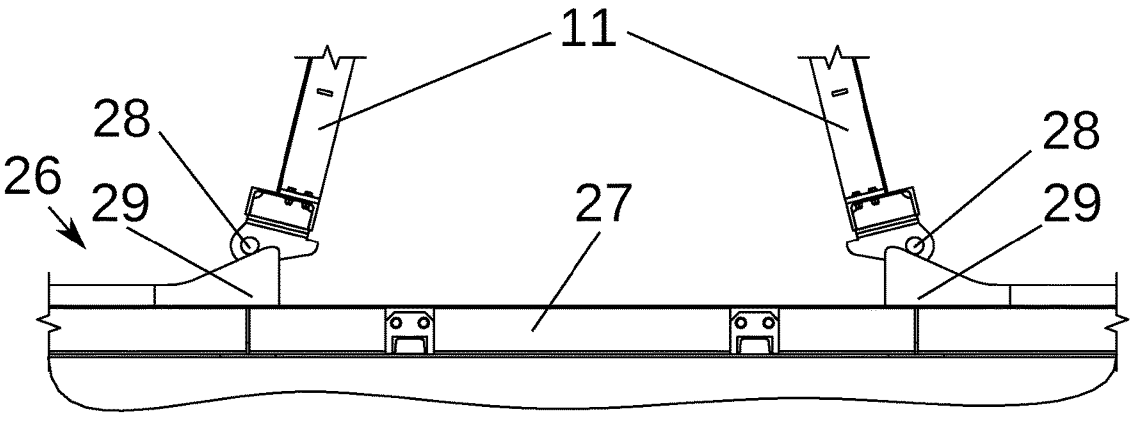
FIG. 10 schematically shows a detail of the formwork device in accordance with FIG. 9.
Figures 11, 12:
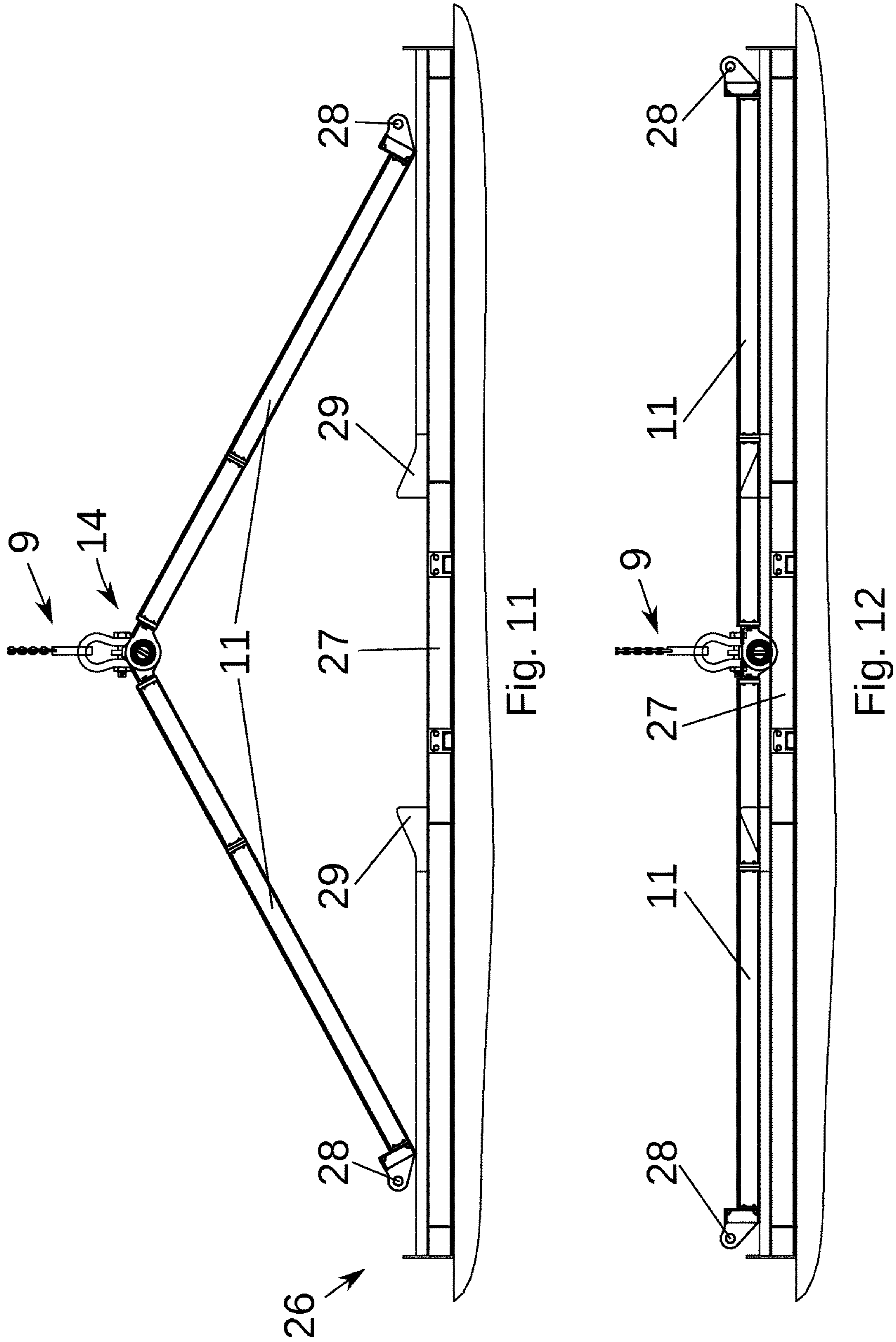
FIG. 11 shows schematically the formwork device in accordance with FIG. 8 during the transfer of the two formwork elements from the standing state into the lying state.
FIG. 12 schematically shows the formwork device in accordance with FIG. 13 in the lying state.

With the aid of the embodiment of the spreading device 18 shown in FIG. 5, the formwork elements 11 of a formwork device 2 according to the disclosure can be transferred into the lying state. For this purpose, two spreading devices 18 in accordance with the embodiment in FIG. 5 are arranged on a substrate in such a way that the guide paths 27 of the spreading devices 18 are aligned parallel to each other. After drying and removing the precast concrete elements from the formwork elements 11, as shown in FIG. 6, the formwork elements 11 are arranged with the aid of the lifting device 9 in the standing state above the substrate above the spreading devices 18. The formwork elements 11 are arranged in such a way that the bolts 23, which are fixed in the drill holes of the connecting elements 16 and are intended as guide bolts, are positioned directly above the receiving recesses 25 of the spreading devices 18. Thereafter, as shown in FIG. 7, the formwork elements 11 are lowered onto the spreading devices 18 so that the bolts 23 of the formwork elements 11 are received by the receiving recesses 25 of the spreading devices 18. In the embodiment shown in accordance with FIG. 8-14, the formwork elements 11 each have two bolts 23 so that four bolts 23 in total of the formwork elements 11 are received into the four receiving recesses 25 in total of the two spreading devices 18. When the bolts 23 are received in the receiving recess 25, the compression springs 36 of the two spreading devices 18 are actuated, whereby the coupling rods 35 connected to the compression springs 36 each detach the hooks 32 from the holding devices 33. In the case of further lowering of the formwork elements 11, the second end regions 15 are spread apart using the lever elements 20 of the spreading devices 18, wherein, as shown in FIGS. 10 and 11, the lever elements 20 of each spreading device 18 are pivoted over the pivot axis 22 in opposing directions until the support elements 28 of the formwork elements 11, as shown in FIG. 12, rest on the sloping transfer sections 29. In the embodiment shown in accordance with FIG. 6-12, the four support elements 28 of the two formwork elements 11 in total are support bolts, which are arranged above the two guide paths 27 when the connecting elements 16 and the bolts 23 are received in the receiving recesses 25 of the spreading devices 18. Alternatively, the support elements 28 can be designed as support rollers. The four transfer sections 29 in total of the two guide paths 27 are arranged in such a way that, when the second end regions 15 of the formwork elements 11 are lowered and spread apart, the support elements 28 of the formwork elements 11 rest on the transfer sections 29 of the guide paths 27. In the case of further lowering of the formwork elements 11, these are spread further apart by guiding the support elements 28 on the guide paths 27, wherein the bolts 23 move out of the receiving recesses 25 of the spreading devices 18. Thus, as shown in FIG. 11-14, the formwork elements 11 are moved by means of the guide paths 27 of the opening devices 26 from the spread-apart state of the second end regions 15 into the lying state of the formwork elements 11. As a result, the formwork elements 11 can be easily cleaned and reloaded.

The invention claimed is:

1. A formwork device, for a manufacture of construction elements, comprising:
- two formwork elements, each of which comprises a formwork front side for concrete to be applied, and a formwork rear side, wherein the formwork elements are pivotably connected to each other at first end regions so that the formwork elements can be transferred from a standing state to a lying state, and a spreading device for spreading apart of second end regions of the formwork elements starting from the standing state of the formwork elements, said second end regions being opposite to the first end regions,
- wherein the spreading device comprises a force deflection device engaging at the second end regions of the formwork elements, which force deflection device converts a lowering of the formwork elements into the spreading apart of the second end regions of the formwork elements,
- wherein the force deflection device comprises two lever elements engaging at the second end regions of the formwork elements, and
- wherein the two lever elements are connected to each other via a pivot bearing, with a pivot axis which is essentially stationary when spreading apart the formwork elements, wherein the pivot axis is essentially parallel to a pivot axis of the formwork elements.

2. The formwork device according to claim 1, wherein the pivot bearing comprises an essentially horizontal contact surface for support on a substrate when lowering the formwork elements with the spreading device attached to it.

3. The formwork device according to claim 1, wherein the lever elements comprise receiving recesses for accommodating corresponding guide elements at the second end regions of the formwork elements.

4. A formwork device according to claim 1, wherein a tensioning device is provided for pre-tensioning the lever elements in a direction of a resting position of the lever elements before the spreading apart of the second end regions of the formwork elements.

5. The formwork device according to claim 1, wherein a releasable locking device for blocking a pivoting of the lever elements in a resting position of the lever elements is provided.

6. The formwork device according to claim 1, wherein an opening device for transferring the formwork elements from the spread-apart state of the second end regions into the lying state of the formwork elements is provided.

7. The formwork device according to claim 6, wherein the opening device comprises at least one guide path for guiding support elements at the second end regions of the formwork elements.

8. The formwork device according to claim 7, wherein the at least one guide path comprises at least one sloping transfer section for receiving the support elements.

9. A battery mould comprising:

two bulkhead partitions, a formwork device according to claim 1.

10. The formwork device according to claim 1, wherein the formwork device is for the arrangement between two bulkhead partitions of a battery mould, for a manufacture of precast concrete elements.

11. The formwork device according to claim 3, wherein the guide elements are guide bolts.

12. The formwork device according to claim 4, wherein the tensioning device is a spring.

13. The formwork device according to claim 7, wherein the support elements are support rollers.

* * * * *